(12) United States Patent
Lin

(10) Patent No.: US 7,773,451 B2
(45) Date of Patent: Aug. 10, 2010

(54) CIRCUIT FOR TRANSFORMING ADDRESS

(75) Inventor: Ju-Pai Lin, Taipei (TW)

(73) Assignee: Zi San Electronics Corp., Taipei (TW)

( * ) Notice: Subject to any disclaimer, the term of this patent is extended or adjusted under 35 U.S.C. 154(b) by 540 days.

(21) Appl. No.: 11/780,380

(22) Filed: Jul. 19, 2007

(65) Prior Publication Data

US 2009/0024822 A1 Jan. 22, 2009

(51) Int. Cl.
*G11C 8/00* (2006.01)
(52) U.S. Cl. ............................. 365/230.06; 365/230.02
(58) Field of Classification Search ............ 365/230.02, 365/230.06
See application file for complete search history.

(56) References Cited

U.S. PATENT DOCUMENTS

| 4,205,390 | A | * | 5/1980 | Sakurai et al. ............... 711/220 |
|---|---|---|---|---|
| 4,774,652 | A | * | 9/1988 | Dhuey et al. ................. 711/202 |
| 5,886,941 | A | * | 3/1999 | Tomita ................... 365/189.15 |
| 6,243,319 | B1 | * | 6/2001 | Yokozeki ............... 365/230.06 |
| 6,725,366 | B1 | * | 4/2004 | Swanberg .................... 712/233 |
| 6,771,557 | B2 | * | 8/2004 | Penney ................... 365/230.06 |
| 7,349,286 | B2 | * | 3/2008 | Poechmueller ......... 365/230.06 |
| 7,394,494 | B2 | * | 7/2008 | Jo .............................. 348/320 |
| 7,623,382 | B2 | * | 11/2009 | Mou et al. ............. 365/185.11 |
| 2004/0081007 | A1 | * | 4/2004 | Park ........................... 365/200 |
| 2005/0057995 | A1 | * | 3/2005 | Mitani et al. ................. 365/222 |

* cited by examiner

*Primary Examiner*—Son L Mai
(74) *Attorney, Agent, or Firm*—WPAT, PC; Justin King

(57) ABSTRACT

A circuit for transforming memory address is disclosed. A first memory address is transformed into a second memory address with more bits than the first memory address for providing a memory. The memory space is an even multiple of the maximum of the first memory address. Therefore a large memory can be used as a small memory.

19 Claims, 6 Drawing Sheets

CIRCUIT FOR TRANSFORMING ADDRESS

BACKGROUND OF THE INVENTION

1. Field of the Invention

The present invention is generally related to a circuit for transforming address, and more particularly to a circuit for transforming address for flash memory.

2. Description of the Prior Art

At present, flash memory is a common storage device for many electronic products. Accompany the advance of technology and the increase of production, the storage capacity of single-die flash memory becomes larger. Small capacity dies become expansive with time or are eliminated.

However, many electronic products have long service life to thereby have users be unable to find suitable memory. Therefore, one method to solve such problem is that a cheap memory with large storage capacity can be used as the original memory with small storage capacity.

SUMMARY OF THE INVENTION

In light of the above background, in order to fulfill the requirements of the industry, the present invention provides a circuit for transforming address. A first memory address is transformed into a second memory address with more bits than the first memory address for providing a memory. The memory space is an even multiple of the maximum of the first memory address. Therefore a large memory can be used as a small memory. Therefore, a cheap memory with large storage capacity can be used as the original memory with small storage capacity.

One object of the present invention is to provide a circuit for transforming memory address. The circuit comprises a buffering module, an address transforming module, and an output module. The number of storage bits of the buffering module is a first bit of a first memory address. The address transforming module transforms the first memory address into a second memory address. The number of storage bits of the address transforming module is a second bit of the second memory address. The second bit is larger than the first bit. The output module outputs the second memory address to a bus where the second memory address is transmitted to a memory via the bus and one byte in the memory is addressed according to the second memory address. The storage space of the memory is a multiple of the addressing space of the processor.

Another object of the present invention is to provide a circuit for transforming memory address, comprising a plurality of buffering circuits, a plurality of output circuits, a plurality of address transforming circuits, at least one address input circuit, and a memory. The plurality of input buffering circuits store the zeroth bit to the seventh bit and the ninth bit to the twenty-second bit of the first memory address. The plurality of output circuits output the second memory address that at least comprises the zeroth bit to the seventh bit and the ninth bit to the twenty-third bit. The plurality of output circuits output the values stored in the plurality of buffering circuits through the address transforming circuits. The zeroth bit to the seventh bit, the ninth bit to the eleventh bit, and the thirteenth bit to the twenty-third bit of the second memory address are the zeroth bit to the seventh bit, the ninth bit to the eleventh bit, and the twelfth bit to the twenty-second bit of the first memory address, respectively. The at least one address input circuit provides the value for the twelfth bit of the second memory address. Moreover, one of $2^{23}$ bytes in the memory is addressed according to the second memory address and the storage space of the memory is not less than $2^{24}$ bytes.

DESCRIPTION OF THE PREFERRED EMBODIMENTS

What is probed into the invention is a circuit for transforming address. Detail descriptions of the structure and elements will be provided in the following in order to make the invention thoroughly understood. Obviously, the application of the invention is not confined to specific details familiar to those who are skilled in the art. On the other hand, the common structures and elements that are known to everyone are not described in details to avoid unnecessary limits of the invention. Some preferred embodiments of the present invention will now be described in greater detail in the following. However, it should be recognized that the present invention can be practiced in a wide range of other embodiments besides those explicitly described, that is, this invention can also be applied extensively to other embodiments, and the scope of the present invention is expressly not limited except as specified in the accompanying claims.

Figure 1:
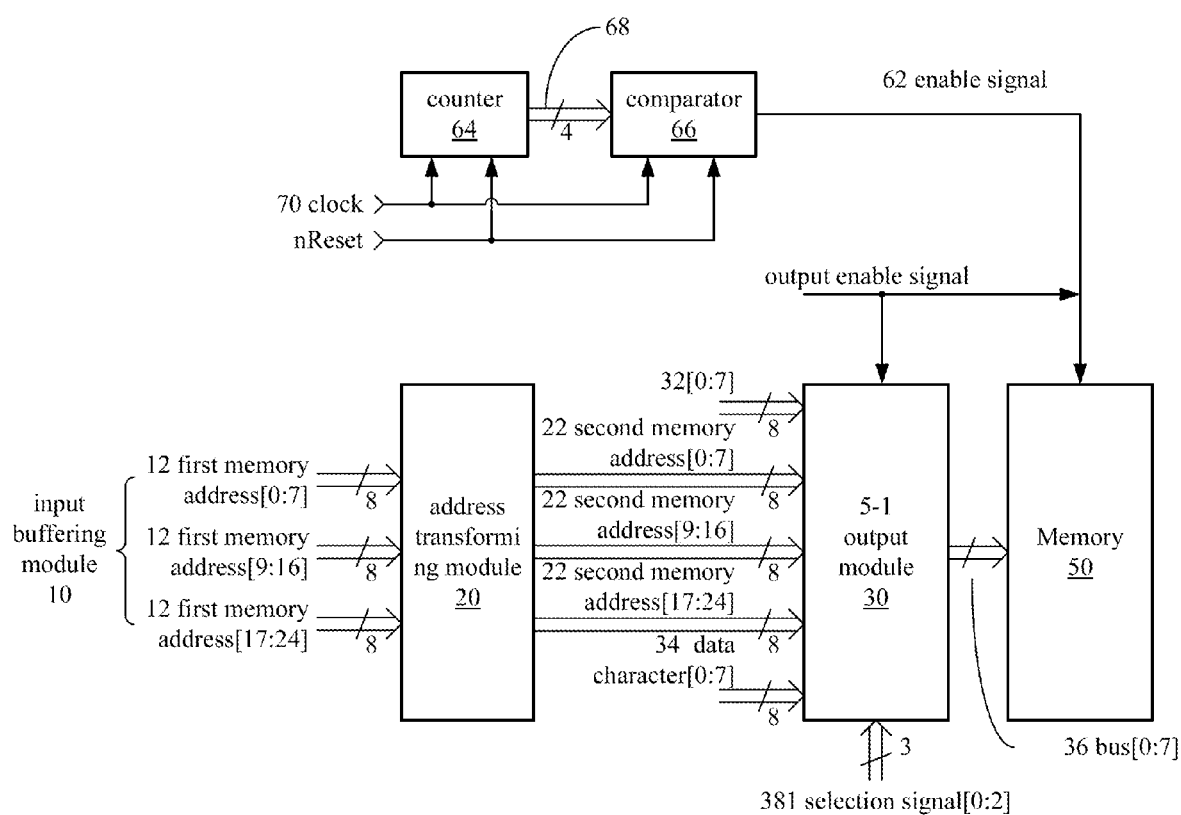
FIG. 1 shows a schematic diagram illustrating the circuit according to the invention.

As shown in FIG. 1, the invention provides a circuit for transforming address, comprising an input buffering module 10, an address transforming module 20, an output module 30, at least one address input circuit 40 (not shown in the figure), and a memory 50.

Figure 2:
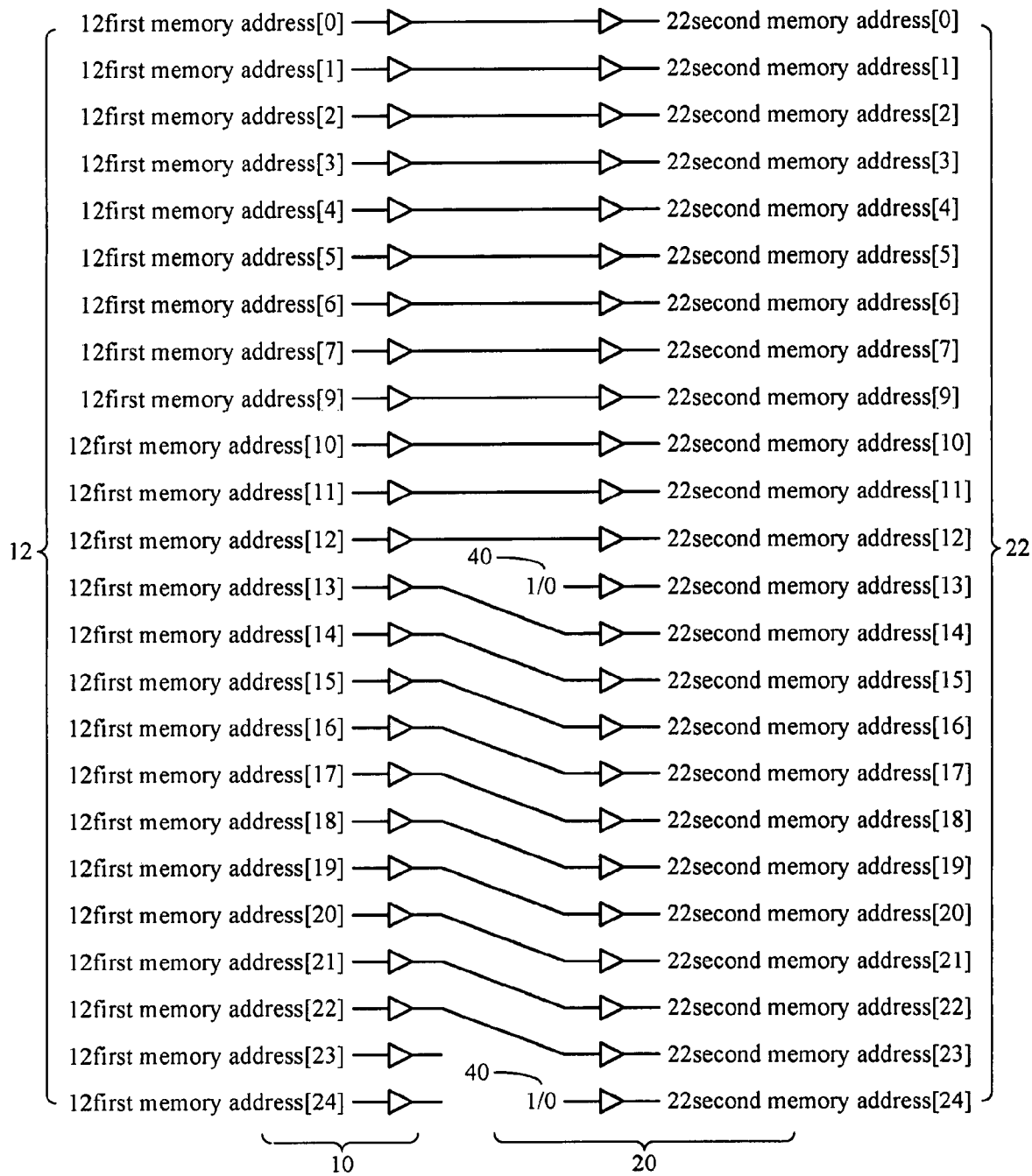
FIG. 2 shows a schematic diagram illustrating the circuits of the input buffering module and the address transforming module according to the invention.

In one embodiment of the present invention, as shown in FIG. 2, the input buffering module 10 comprises a plurality of input buffering circuits for storing the zeroth bit to the seventh bit and the ninth bit to the twenty-second bit of the first memory address 12. Besides, the output module 30 comprises a plurality of output circuits (not shown in FIG. 2) for outputting a second memory address 22. The second memory address 22 at least comprises the zeroth bit to the seventh bit and the ninth bit to the twenty-third bit. Furthermore, the address transforming module 20 comprises a plurality of address transforming circuits. The plurality of output circuits output the values stored in the plurality of buffering circuits through these address transforming circuits. The zeroth bit to the seventh bit, the ninth bit to the eleventh bit, and the thirteenth bit to the twenty-third bit of the second memory address 22 are the zeroth bit to the seventh bit, the ninth bit to the eleventh bit, and the twelfth bit to the twenty-second bit of the first memory address 12, respectively. Moreover, the at least one address input circuit 40 is electrically coupled to the plurality of output circuits and at least provides the value for the thirteen bit of the second memory address 22. Moreover, one of $2^{23}$ bytes in the memory 50 is addressed according to the second memory address 22 and the memory space is not less than $2^{24}$ bytes.

Figure 3:
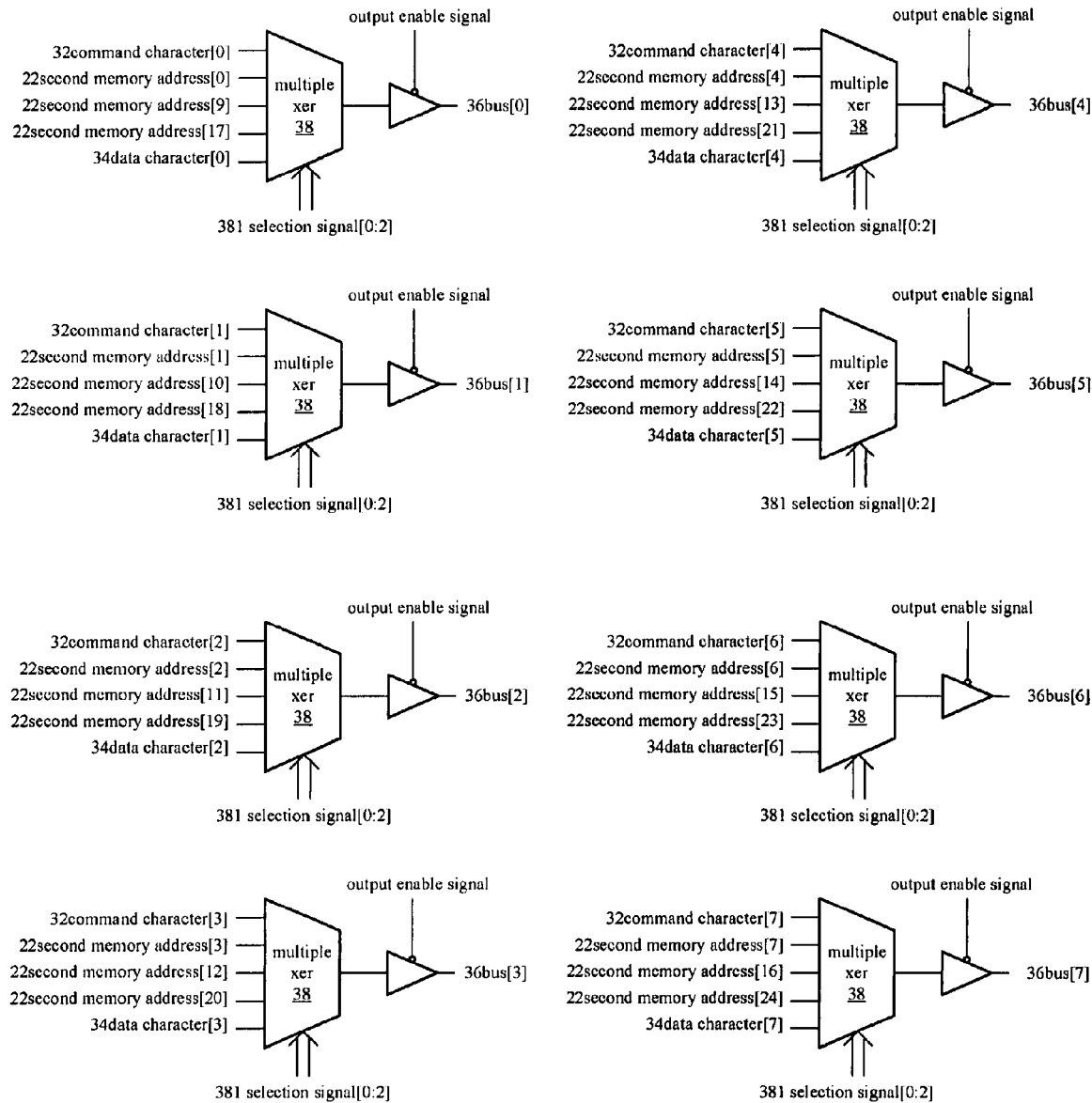
FIG. 3 shows a schematic diagram illustrating the circuit of the output module according to the invention.

The plurality of output circuits of the output module 30 can comprise a plurality of multiplexers. The input comprises a command character 32 and a data character 34. They are electrically coupled to the memory 50 via a bus 36. One embodiment of the invention, as shown in FIG. 3, comprises eight multiplexers. A first multiplexer 31 uses the zeroth bit of the command character 32, the zeroth, the ninth, and the seventeenth bits of the second memory address 22, and the zeroth bit of the data character 34 as input. A second multiplexer 32 uses the first bit of the command character 32, the first, the tenth, and the eighteenth bits of the second memory address 22, and the first bit of the data character 34 as input. A third multiplexer 33 that uses the second bit of the command character 32, the second, the eleventh, and the nineteenth bits of the second memory address 22, and the second bit of the data character 34 as input. A fourth multiplexer 34 uses the third bit of the command character 32, the third, the twelfth, and the twentieth bits of the second memory address 22, and the zeroth bit of the data character 34 as input. A fifth multiplexer 35 uses the fourth bit of the command character 32, the fourth, the thirteenth, and the twenty-first bits of the second memory address 22, and the fourth bit of the data character 34 as input. A sixth multiplexer 36 uses the fifth bit of the command character 32, the fifth, the fourteenth, and the twenty-second bits of the second memory address 22, and the fifth bit of the data character 34 as input. A seventh multiplexer 37 uses the sixth bit of the command character 32, the sixth, the fifteenth, and the twenty-third bits of the second memory address 22, and the sixth bit of the data character 34 as input. An eighth multiplexer 38 uses the seventh bit of the command character 32, the seventh, the sixteenth, and the twenty-fourth bits of the second memory address 22, and the seventh bit of the data character 34 as input. Thus, when the storage space of the memory 50 is $2^{24}$ bytes or $2^{25}$ bytes, the values of the thirteenth bit and the twenty-fourth bit of the second memory address 22 are zeros. The address input circuit 40 provides the values (0) of the thirteenth bit and the twenty-fourth bit of the second memory address 22. That is, in the embodiment of the invention, a large memory, such as having the memory space of $2^{24}$ bytes or $2^{25}$ bytes or even larger, can be used as a small memory, such as having the memory space of $2^{23}$ bytes.

Figure 4:
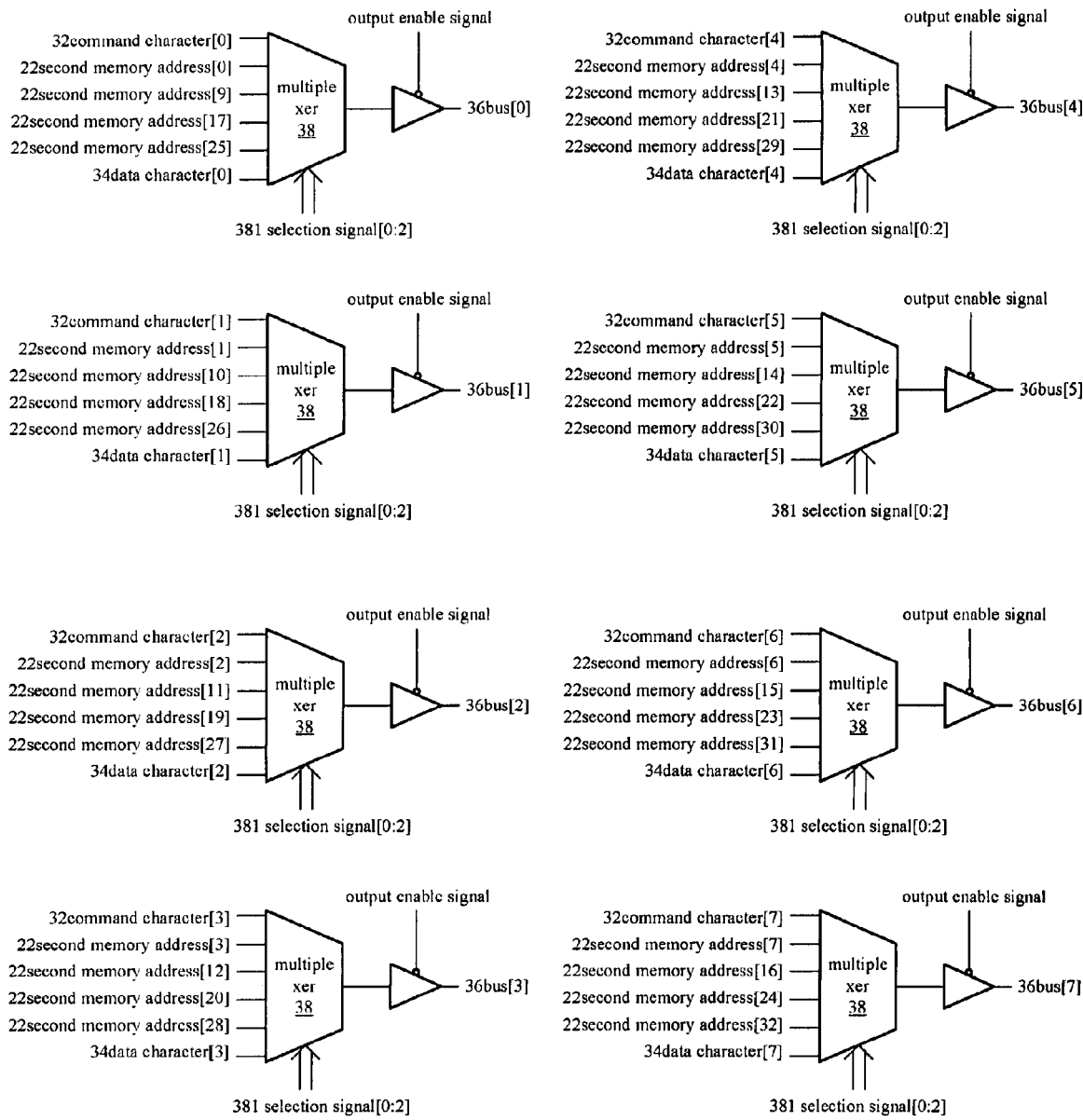
FIG. 4 shows a schematic diagram illustrating the circuit of the output module according to the invention.

Accordingly, in another embodiment of the invention, the memory space can be $2^{26}$ bytes or $2^{33}$ bytes. The plurality of output circuits of the output module 30 can comprise a plurality of multiplexers, as shown in FIG. 4. It comprises eight multiplexers. A first multiplexer 31 uses the zeroth bit of the command character 32, the zeroth, the ninth, the seventeenth, and twenty-fifth bits of the second memory address 22, and the zeroth bit of the data character 34 as input. A second multiplexer 32 uses the first bit of the command character 32, the first, the tenth, the eighteenth, and the twenty-sixth bits of the second memory address 22, and the first bit of the data character 34 as input. A third multiplexer 33 uses the second bit of the command character 32, the second, the eleventh, the nineteenth, and the twenty-seventh bits of the second memory address 22, and the second bit of the data character 34 as input. A fourth multiplexer 34 uses the third bit of the command character 32, the third, the twelfth, the twentieth, and the twenty-eighth bits of the second memory address 22, and the zeroth bit of the data character 34 as input. A fifth multiplexer 35 uses the fourth bit of the command character 32, the fourth, the thirteenth, the twenty-first, and the twenty-ninth bits of the second memory address 22, and the fourth bit of the data character 34 as input. A sixth multiplexer 36 uses the fifth bit of the command character 32, the fifth, the fourteenth, the twenty-second, and the thirtieth bits of the second memory address 22, and the fifth bit of the data character 34 as input. A seventh multiplexer 37 uses the sixth bit of the command character 32, the sixth, the fifteenth, the twenty-third, the thirty-first bits of the second memory address 22, and the sixth bit of the data character 34 as input. An eighth multiplexer 38 uses the seventh bit of the command character 32, the seventh, the sixteenth, the twenty-fourth, and the thirty-second bits of the second memory address 22, and the seventh bit of the data character 34 as input. Thus, when the storage space of the memory 50 is $2^{24}$ bytes, $2^{25}$ bytes, $2^{26}$ bytes, $2^{27}$ bytes, $2^{28}$ bytes, $2^{29}$ bytes, $2^{30}$ bytes, $2^{31}$ bytes, $2^{32}$ bytes, or $2^{33}$ bytes, the values of the thirteenth bit and the twenty-fourth bit to the thirty-second bit of the second memory address 22 are zeros. The address input circuit 40 provides the values (0) of the thirteenth bit and the twenty-fourth bit to the thirty-second bit of the second memory address 22.

Figure 5:
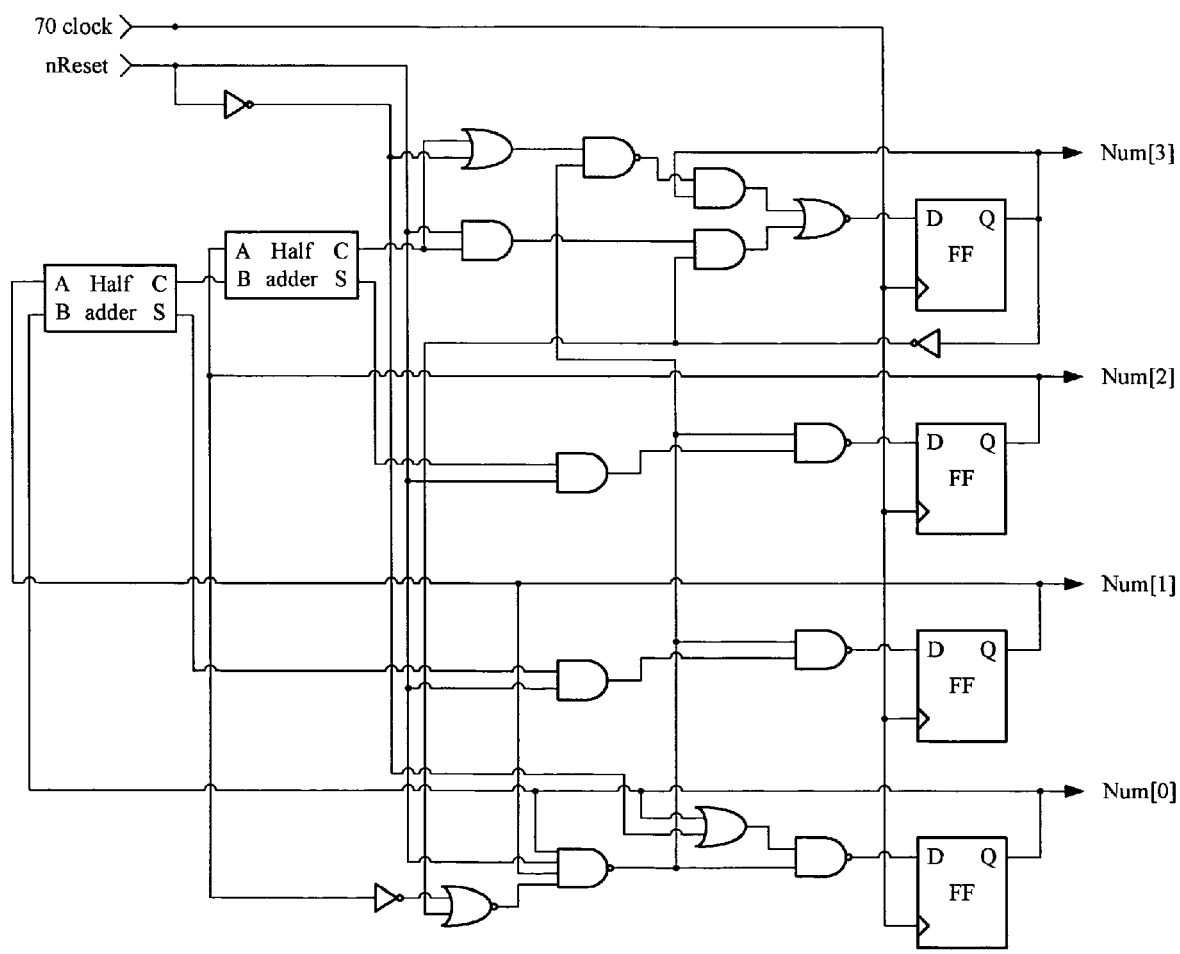
FIG. 5 shows a schematic diagram illustrating the protecting circuit according to the invention.
Figure 6:
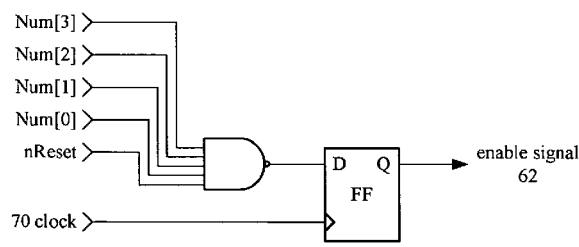
FIG. 6 shows a schematic diagram illustrating the protecting circuit according to the invention.

The invention further comprises a protecting circuit 60. The protecting circuit 60 outputs an enable signal 62 and one of $2^{23}$ bytes in the memory 50 is addressed according to the second memory address 22 after receiving the enable signal 62. It is known by those who are skilled in the art that the protecting circuit 60 is utilized to ensure the input voltage of the memory 50 being higher than a threshold value (standard voltage) before the writing data operation. In a better example of the invention, the protecting circuit 60 comprises a counter 64 and a comparator 66. The counter 64 accumulates the input of a clock 70 and then outputs a counting value 68. The comparator 66 compares the counting value 68 with a preset value and then outputs the enable signal 62 when the counting value 68 matches the preset value. In other words, the time needed for the input voltage reaching the threshold value can be calculated and then a preset value can be obtained according to the clock 70. The writing operation of the memory 50 is delayed until the counter 64 counts to the preset value. FIGS. 5 and 6 are schematic diagrams illustrating the counter 64 and the comparator 66 as an example. For those who are skilled in the art, other methods can also be applied and will not be described in details.

Figure 7:
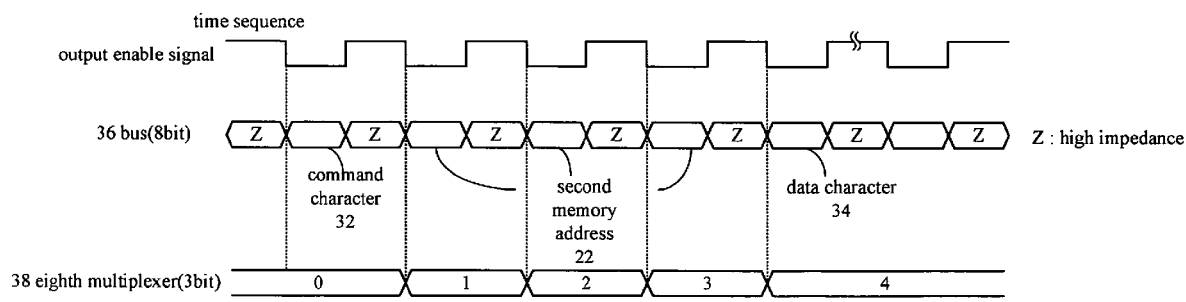
FIG. 7 shows a schematic diagram illustrating the time sequence according to the invention.

FIG. 7 shows a schematic diagram illustrating the time sequence according to one embodiment of the invention. The output module 30 is electrically coupled to the memory 50 via the bus 36. In this embodiment, the output of the output module 30 is controlled by an output enable signal $\overline{OE}$ and a selection signal 381. The command character 32, the second memory address 22, the data character 34 are outputted sequentially according to the selection of the selection signal 381.

Obviously many modifications and variations are possible in light of the above teachings. It is therefore to be understood that within the scope of the appended claims the present invention can be practiced otherwise than as specifically described herein. Although specific embodiments have been illustrated and described herein, it is obvious to those skilled in the art that many modifications of the present invention may be made without departing from what is intended to be limited solely by the appended claims.

What is claimed is:

1. A circuit for transforming memory address, comprising:
   a buffering module including a first number of storage bits, wherein said first number of storage bits is a first bit of a first memory address;
   an address transforming module for transforming said first memory address into a second memory address and including a second number of storage bits, wherein said second number of storage bits of said address transforming module is a second bit of said second memory address, and said second bit is larger than said first bit; and an output module for outputting a data character with a plurality of bits and outputting said second memory address to a bus wherein said second memory address is transmitted to a memory via said bus and a byte in said memory is addressed according to said second memory address.

2. The circuit according to claim 1, wherein said address transforming module further comprises at least one address input circuit, each of which provides the value of one bit for said second memory address, separately.

3. The circuit according to claim 2, wherein said buffering module comprises a plurality of input buffering circuits for storing the zeroth bit to the seventh bit and the ninth bit to the twenty-second bit of said first memory address.

4. The circuit according to claim 3, wherein said output module comprises a plurality of output circuits for outputting said second memory address that at least comprises the zeroth bit to the seventh bit and the ninth bit to the twenty-third bit.

5. The circuit according to claim 4, wherein said address transforming module comprises a plurality of address transforming circuits, through which said plurality of output circuits output the values stored in said plurality of buffering circuits, and the zeroth bit to the seventh bit, the ninth bit to the eleventh bit, and the thirteenth bit to the twenty-third bit of said second memory address are the zeroth bit to the seventh bit, the ninth bit to the eleventh bit, and the twelfth bit to the twenty-second bit of said first memory address, respectively, in which said at least one address input circuit provides the values for the twelfth bit and the twenty-fourth bit of said second memory address.

6. The circuit according to claim 3, wherein one of $2^{23}$ bytes in said memory is addressed according to said second memory address and the storage space of said memory is not less than $2^{24}$ bytes.

7. The circuit according to claim 5, wherein said plurality of address transforming circuits comprise eight multiplexers, each of which comprises an input with at least five bits and an output with one bit.

8. The circuit according to claim 5, wherein at least three bits in said input with at least five bits use at least three bits in said second memory address as input.

9. The circuit according to claim 8, wherein said eight multiplexers comprise:
a first multiplexer that uses the zeroth bit of a command character, the zeroth, the ninth, and the seventeenth bits of said second memory address, and the zeroth bit of a data character as input;
a second multiplexer that uses the first bit of said command character, the first, the tenth, and the eighteenth bits of said second memory address, and the first bit of said data character as input;
a third multiplexer that uses the second bit of said command character, the second, the eleventh, and the nineteenth bits of said second memory address, and the second bit of said data character as input;
a fourth multiplexer that uses the third bit of said command character, the third, the twelfth, and the twentieth bits of said second memory address, and the zeroth bit of said data character as input;
a fifth multiplexer that uses the fourth bit of said command character, the fourth, the thirteenth, and the twenty-first bits of said second memory address, and the fourth bit of said data character as input;
a sixth multiplexer that uses the fifth bit of said command character, the fifth, the fourteenth, and the twenty-second bits of said second memory address, and the fifth bit of said data character as input;
a seventh multiplexer that uses the sixth bit of said command character, the sixth, the fifteenth, and the twenty-third bits of said second memory address, and the sixth bit of said data character as input; and
an eighth multiplexer that uses the seventh bit of said command character, the seventh, the sixteenth, and the twenty-fourth bits of said second memory address, and the seventh bit of said data character as input.

10. The circuit according to claim 9, wherein the space of said memory is $2^{24}$ bytes and the twenty-fourth bit of said second memory address is zero.

11. The circuit according to claim 9, wherein the space of said memory is $2^{25}$ bytes and the twenty-fourth bit of said second memory address is zero.

12. The circuit according to claim 8, wherein said at least one address input circuit further comprises providing the values of the twenty-fifth bit to the thirty-second bit of said second memory address.

13. The circuit according to claim 12, wherein said eight multiplexers comprise:
a first multiplexer that uses the zeroth bit of a command character, the zeroth, the ninth, the seventeenth, and twenty-fifth bits of said second memory address, and the zeroth bit of a data character as input;
a second multiplexer that uses the first bit of said command character, the first, the tenth, the eighteenth, and the twenty-sixth bits of said second memory address, and the first bit of said data character as input;
a third multiplexer that uses the second bit of said command character, the second, the eleventh, the nineteenth, and the twenty-seventh bits of said second memory address, and the second bit of said data character as input;
a fourth multiplexer that uses the third bit of said command character, the third, the twelfth, the twentieth, and the twenty-eighth bits of said second memory address, and the zeroth bit of said data character as input;
a fifth multiplexer that uses the fourth bit of said command character, the fourth, the thirteenth, the twenty-first, and the twenty-ninth bits of said second memory address, and the fourth bit of said data character as input;
a sixth multiplexer that uses the fifth bit of said command character, the fifth, the fourteenth, the twenty-second, and the thirtieth bits of said second memory address, and the fifth bit of said data character as input;
a seventh multiplexer that uses the sixth bit of said command character, the sixth, the fifteenth, the twenty-third, the thirty-first bits of said second memory address, and the sixth bit of said data character as input; and
an eighth multiplexer that uses the seventh bit of said command character, the seventh, the sixteenth, the twenty-fourth, and the thirty-second bits of said second memory address, and the seventh bit of said data character as input.

14. The circuit according to claim 13, wherein the space of said memory is $2^{26}$ bytes and the twenty-fourth bit to the thirty-second bit of said second memory address are zeros.

15. The circuit according to claim 6, further comprising a protecting circuit wherein said protecting circuit outputs an enable signal and one of $2^{23}$ bytes in said memory is addressed according to said second memory address after receiving said enable signal.

16. The circuit according to claim 15, wherein said protecting circuit comprises:
- a counter for accumulating the input of a clock and then outputting a counting value; and
- a comparator for comparing said counting value with a preset value and then outputting said enable signal when said counting value matches said preset value.

17. The circuit according to claim 15, wherein the input voltage of said memory is higher than a threshold value before matching with said preset value in said counter.

18. A circuit for transforming memory address, comprising:
- a buffering module including a first number of storage bits, wherein said first number of storage bits is a first bit of a first memory address;
- an address transforming module for transforming said first memory address into a second memory address and including a second number of storage bits, wherein said second number of storage bits of said address transforming module is a second bit of said second memory address, and said second bit is larger than said first bit; and
- an output module, for outputting a data character with a plurality of bits, outputting a command character with a plurality of bits, and outputting said second memory address to a bus, wherein said second memory address is transmitted to a memory via said bus and a byte in said memory is addressed according to said second memory address.

19. A circuit for transforming memory address, comprising:
- a buffering module including a first number of storage bits, wherein said first number of storage bits is a first bit of a first memory address;
- an address transforming module, for transforming said first memory address into a second memory address, comprising a second number of storage bits and a plurality of multiplexers, each of which comprises an input with a plurality of bits and an output with one bit, wherein said second number of storage bits of said address transforming module is a second bit of said second memory address, and said second bit is larger than said first bit; and
- an output module for outputting a data character with a plurality of bits and outputting said second memory address to a bus wherein said second memory address is transmitted to a memory via said bus and a byte in said memory is addressed according to said second memory address.

* * * * *